United States Patent
Choi et al.

(10) Patent No.: US 9,747,607 B2
(45) Date of Patent: Aug. 29, 2017

(54) METHOD AND APPARATUS FOR PROVIDING MOBILE ADVERTISING SERVICE IN MOBILE ADVERTISING SYSTEM

(75) Inventors: Seok-Hoon Choi, Seongnam-si (KR); Sung-Oh Hwang, Yongin-si (KR)

(73) Assignee: Samsung Electronics Co., Ltd (KR)

( * ) Notice: Subject to any disclaimer, the term of this patent is extended or adjusted under 35 U.S.C. 154(b) by 981 days.

(21) Appl. No.: 13/263,682

(22) PCT Filed: Mar. 11, 2010

(86) PCT No.: PCT/KR2010/001534
§ 371 (c)(1),
(2), (4) Date: Oct. 7, 2011

(87) PCT Pub. No.: WO2010/117141
PCT Pub. Date: Oct. 14, 2010

(65) Prior Publication Data
US 2012/0041824 A1  Feb. 16, 2012

(30) Foreign Application Priority Data
Apr. 10, 2009 (KR) .................. 10-2009-0031547

(51) Int. Cl.
G06Q 30/00 (2012.01)
G06Q 30/02 (2012.01)

(52) U.S. Cl.
CPC ......... G06Q 30/02 (2013.01); G06Q 30/0267 (2013.01)

(58) Field of Classification Search
None
See application file for complete search history.

(56) References Cited

U.S. PATENT DOCUMENTS 5,978,386 A * 11/1999 Hamalainen ............ H04L 29/06
370/338
7,418,268 B1   8/2008 Cabano et al.
(Continued)

FOREIGN PATENT DOCUMENTS

KR   1020050091979   9/2005
KR   1020060018031   2/2006
(Continued)

OTHER PUBLICATIONS

Canadian Office Action dated Jul. 13, 2015 issued in counterpart application No. 2,758,269, 7 pages.
(Continued)

*Primary Examiner* — Matthew T Sittner
(74) *Attorney, Agent, or Firm* — The Farrell Law Firm, P.C.

(57) ABSTRACT

A method and apparatus is provided for providing a mobile advertising service in a mobile advertising system, and for sharing a preference to deliver a personalized advertisement requested by a particular group member to other users. In a method for providing a mobile advertising service by a server of a mobile advertising system, a group creation request message including a user list and a group user preference is received from an advertising engine, a group is created according to the user list and the group user preference in the group creation request message, a response message to the group creation request message is sent to the advertising engine, an advertisement request message is received from one of advertising engines included in the user list, an advertisement appropriate for the group user preference is selected, and the selected advertisement is delivered to at least one advertising engine included in the user list. The at least one advertising engine is included in the same group.

19 Claims, 4 Drawing Sheets

(56) References Cited

U.S. PATENT DOCUMENTS

| | | | | |
|---|---|---|---|---|
| 7,451,202 B2* | 11/2008 | Nakahara | G06F 21/10 | 370/312 |
| 7,738,899 B1* | 6/2010 | Manroa | G06Q 10/10 | 455/412.2 |
| 7,941,525 B1* | 5/2011 | Yavilevich | G06Q 30/02 | 709/203 |
| 2001/0047294 A1* | 11/2001 | Rothschild | G06Q 30/02 | 705/14.47 |
| 2002/0016961 A1* | 2/2002 | Goode | H04N 7/173 | 725/9 |
| 2002/0072966 A1* | 6/2002 | Eldering | G06Q 30/02 | 705/14.56 |
| 2002/0123959 A1* | 9/2002 | Mozley | G06Q 30/0601 | 705/37 |
| 2002/0161779 A1* | 10/2002 | Brierley | G06Q 30/02 | |
| 2002/0184097 A1* | 12/2002 | Hijiri | G06Q 30/02 | 705/14.55 |
| 2003/0126137 A1* | 7/2003 | McFadden | G06F 17/30604 | |
| 2003/0216961 A1* | 11/2003 | Barry | A63F 13/12 | 705/14.12 |
| 2003/0233540 A1* | 12/2003 | Banerjee | H04L 12/185 | 713/153 |
| 2004/0044558 A1* | 3/2004 | Ohwa | G06Q 30/02 | 358/1.15 |
| 2004/0213193 A1* | 10/2004 | Longoni | H04L 12/2838 | 370/342 |
| 2004/0215735 A1* | 10/2004 | Nakahara | G06F 21/10 | 709/207 |
| 2005/0144049 A1* | 6/2005 | Kuzunuki | G01C 21/34 | 705/6 |
| 2005/0232423 A1* | 10/2005 | Horvitz | G06Q 10/10 | 380/255 |
| 2005/0256796 A1* | 11/2005 | Haga | G06Q 30/08 | 705/313 |
| 2006/0282326 A1* | 12/2006 | Lombardi | G06Q 30/02 | 705/14.36 |
| 2007/0028261 A1* | 2/2007 | Bouilloux-Lafont | G06Q 30/02 | 725/32 |
| 2007/0105571 A1* | 5/2007 | Choi | G06Q 30/0258 | 455/466 |
| 2007/0124154 A1* | 5/2007 | Cesarini | G06Q 20/102 | 705/35 |
| 2007/0179857 A1* | 8/2007 | Collins | G06Q 30/0254 | 705/14.52 |
| 2007/0198339 A1* | 8/2007 | Shen | G06Q 30/02 | 705/14.64 |
| 2007/0208623 A1* | 9/2007 | Worden | G06Q 30/02 | 705/14.55 |
| 2007/0214118 A1* | 9/2007 | Schoen | G06F 17/30864 | |
| 2007/0244755 A1* | 10/2007 | Do | G06Q 30/02 | 705/14.54 |
| 2008/0003999 A1* | 1/2008 | Sung | H04W 28/18 | 455/422.1 |
| 2008/0008106 A1* | 1/2008 | Boberg | H04L 12/185 | 370/270 |
| 2008/0040799 A1* | 2/2008 | Matsuda | G06Q 20/102 | 726/21 |
| 2008/0189162 A1* | 8/2008 | Ganong | G06F 17/3089 | 705/7.13 |
| 2008/0215426 A1* | 9/2008 | Guldimann | G06Q 30/02 | 705/14.61 |
| 2008/0235084 A1* | 9/2008 | Quoc | G06Q 30/0242 | 705/14.41 |
| 2008/0235090 A1 | 9/2008 | Lundstrom et al. | | |
| 2009/0006202 A1* | 1/2009 | Alroy | G06Q 30/0269 | 705/14.66 |
| 2009/0037736 A1* | 2/2009 | Djordjrvic | H04L 63/062 | 713/170 |
| 2009/0048905 A1* | 2/2009 | Feng | G06Q 30/00 | 705/14.43 |
| 2009/0070204 A1* | 3/2009 | Clancy, Jr. | G06Q 30/0264 | 705/14.61 |
| 2009/0076887 A1* | 3/2009 | Spivack | G06Q 30/02 | 705/14.69 |
| 2009/0076894 A1* | 3/2009 | Bates | G06Q 30/02 | 705/14.61 |
| 2009/0083260 A1* | 3/2009 | Artom | G06F 17/30817 | |
| 2009/0094044 A1* | 4/2009 | Peterson, Jr. | G06Q 30/02 | 705/1.1 |
| 2009/0099931 A1* | 4/2009 | Aaltonen | G06Q 30/0257 | 705/14.55 |
| 2009/0106076 A1* | 4/2009 | Coley | G06Q 30/02 | 705/7.29 |
| 2009/0119165 A1* | 5/2009 | Cotgreave | G06Q 30/0258 | 705/14.56 |
| 2009/0132368 A1* | 5/2009 | Cotter | G06Q 30/0257 | 705/14.55 |
| 2009/0157798 A1* | 6/2009 | Laumen | H04W 4/08 | 709/203 |
| 2009/0177525 A1* | 7/2009 | Aaltonen | G06F 17/30867 | 705/14.66 |
| 2009/0197616 A1 | 8/2009 | Lewis et al. | | |
| 2009/0222333 A1* | 9/2009 | Rivas | G06Q 10/10 | 705/14.53 |
| 2009/0234735 A1* | 9/2009 | Maurer | G06F 21/10 | 705/14.49 |
| 2009/0251277 A1* | 10/2009 | O'Hara | G06Q 30/02 | 340/5.1 |
| 2009/0259519 A1* | 10/2009 | Cronin | G06Q 30/02 | 705/7.29 |
| 2010/0017261 A1* | 1/2010 | Evans | G06Q 30/02 | 705/7.34 |
| 2010/0057754 A1* | 3/2010 | Moudy | G06Q 20/382 | 707/E17.044 |
| 2010/0093317 A1* | 4/2010 | Ghotge | G06Q 30/02 | 455/414.1 |
| 2010/0094703 A1* | 4/2010 | Bramley | G06Q 30/02 | 705/14.45 |
| 2010/0174610 A1* | 7/2010 | Del Real | G06F 17/30058 | 705/14.73 |
| 2010/0183008 A1* | 7/2010 | Fernandez Gutierrez | H04L 12/66 | 370/390 |
| 2010/0250327 A1* | 9/2010 | Relyea, Jr. | G06Q 30/02 | 705/14.53 |
| 2011/0066499 A1* | 3/2011 | Anatolievich | G06Q 30/02 | 705/14.56 |
| 2012/0041824 A1* | 2/2012 | Choi | G06Q 30/0267 | 705/14.64 |

FOREIGN PATENT DOCUMENTS

| | | |
|---|---|---|
| KR | 1020070048415 | 5/2007 |
| KR | 1020100116650 | 11/2010 |
| WO | WO 2007098487 | 8/2007 |

OTHER PUBLICATIONS

Korean Office Action dated May 18, 2016 issued in counterpart application No. 10-2009-0031547, 6 pages.

PCT/ISA/237 Written Opinion issued on PCT/KR2010/001534 (4 pages).

PCT/ISA/210 Search Report issued on PCT/KR2010/001534 (3 pages).

* cited by examiner

METHOD AND APPARATUS FOR PROVIDING MOBILE ADVERTISING SERVICE IN MOBILE ADVERTISING SYSTEM

TECHNICAL FIELD

The present invention relates generally to a mobile advertising system, and more particularly, to a method and apparatus for providing a mobile advertising service in a mobile advertising system.

BACKGROUND ART

The mobile communicant market continues to require creation of new services through recombination or integration of the existing technologies. Current development of communication and broadcast technologies has allowed conventional broadcasting systems and mobile communication systems to provide advertising services through portable terminals (or mobile terminals), such as mobile phones and Personal Digital Assistants (PDAs).

Due to latent and actual market needs and increasing user demands for multimedia services, service providers' intended strategies for providing new services such as advertising services in addition to the existing voice service and data service, and the identified interests of Information Technology (IT) companies which are bolstering their mobile communication businesses to meet the user's demands, convergence of mobile communication service and Internet Protocol (IP) has become a priority in the development of next generation mobile communication technologies.

Open Mobile Alliance (OMA), a group for studying the standard for interoperability between individual mobile solutions, serves to define various application standards for mobile games, Internet services and the like. Of the OMA Working Groups, Open Mobile Alliance Requirement (OMA REQ) Working Group and Open Mobile Alliance Content Delivery (OMA CD) Working Group are researching on the technology standard for offering Mobile Advertising (MobAd) service.

The mobile terminal transmits its preference to an advertising server via an advertising engine when subscribing to an advertising service or requesting an advertisement, so that a personalized advertisement may be provided through a mobile advertising system based on the mobile advertising service technology. Then the advertising server selects an advertisement satisfying the user's preference information from the advertisements received from an advertiser and delivers it to the advertising engine, thereby providing a personalized advertising service to the user. In the conventional mobile advertising service, since the preference that the user provides to receive a personalized advertisement is personal information specific to a particular user, it is strictly limited for other users to use this information. For example, even though a particular user desires to deliver the requested personalized advertisement to group members or other users, like when one of IPod (a mobile multimedia player designed and launched by Apple) club members intends to allow other members to receive the advertisement he has received, the respective group members cannot use the preference information of the particular user and should provide the preference including the same information to the advertising server independently. Then the advertising server delivers advertisements to the users referring to the received preference information of the respective users. Therefore, there is a need for a preference sharing method in which an advertising server can provide the same personalized advertising service as that of a particular user to group members or other users based on the preference set by the particular user.

DISCLOSURE OF INVENTION

Technical Problem

An aspect of the present invention is to address at least the above-mentioned problems and/or disadvantages and to provide at least the advantages described below. Accordingly, an aspect of the present invention provides a method and apparatus for providing a mobile advertising service in a mobile advertising system, in which preference information of a particular user is shared on a group basis.

Another aspect of the present invention provides a method and apparatus for providing a mobile advertising service in a mobile advertising system, which delivers a personalized advertisement requested by a particular group member to other group members using shared user information in a mobile advertising (MobAd) technology aimed to support different types of delivery systems to deliver user-specific advertisements.

Solution to Problem

In accordance with one aspect of the present invention, there is provided a method for providing a mobile advertising service in a server of a mobile advertising system, in which a group creation request message including a user list and a group user preference is received from an advertising engine, a group is created according to the user list and the group user preference in the group creation request message, a response message to the group creation request message is sent to the advertising engine, an advertisement request message is received from one of advertising engines included in the user list, an advertisement appropriate for the group user preference is selected, and the selected advertisement is delivered to at least one advertising engine included in the user list. The at least one advertising engine is included in the same group.

In accordance with another aspect of the present invention, there is provided a method for providing a mobile advertising service in a server of a mobile advertising system, in which the server determines whether update information exists, upon receiving from a specific advertising engine in a group list a group information update request message including group user information in which update information is reflected, the update information of the group user information is checked and stored if the update information exists, a group information update response message is sent to at least one advertising engine included in the group user information, and an advertisement is delivered to the at least one advertising engine included in the group user information. The at least one advertising engine is included in the same group.

Advantageous Effects of Invention

When group members or other users desire to receive from the Ad server 120 the same personalized advertisement as that requested by a particular user, the present invention may reduce a transmission overhead of user information by using group user information that can share preference setting without transmitting respective updated user information.

In addition, the present invention can deliver the personalized advertisement requested by a particular group member to other group members using shared user information in the mobile advertising technology aimed to support different types of delivery systems to deliver user-specific advertisements.

MODE FOR THE INVENTION

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions are omitted for clarity and conciseness.

The names of the entities defined in 3rd Generation Partnership Project (3GPP) which is the asynchronous mobile communication standard, or Open Mobile Alliance (OMA) which is the standard organization for applications of mobile terminals will be used for the convenience of description, but it is not intended to limit the scope of the present invention to these standards and entity names, and the present invention may be applied to any systems having similar technical backgrounds.

Figure 1:
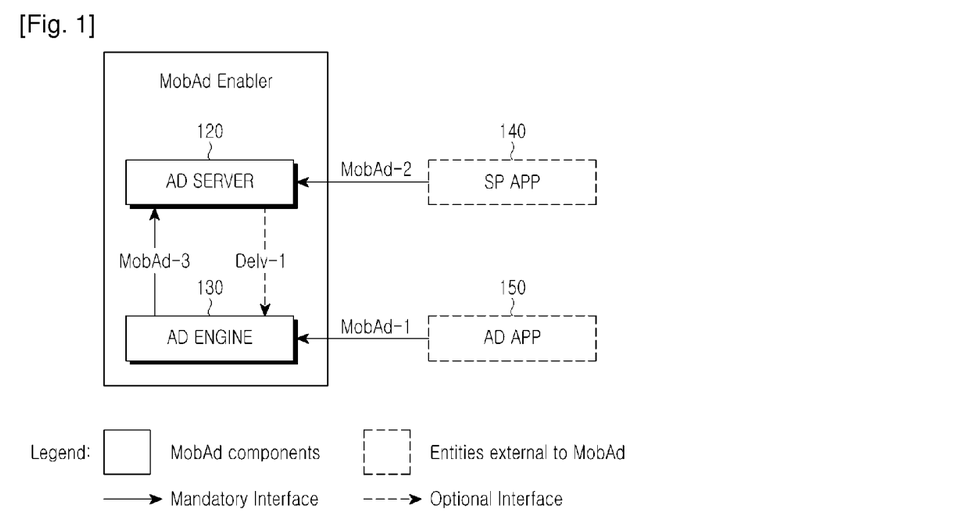
FIG. 1 shows structures of a mobile advertising system and interfaces between respective entities, to which the present invention is applied.

FIG. 1 shows structures of a mobile advertising system and interfaces between respective entities in a mobile communication system to which the present invention is applied. The mobile advertising system (or MobAd enabler) includes an advertising engine (Ad engine) 130 and an advertising server (Ad server) 120, which are both mandatory components, and also includes interfaces provided by the mandatory components. The other components and interfaces are merely shown to describe an interaction with the mobile advertising system, and will not be described in this specification.

The Ad engine 130, a MobAd enabler component located in a terminal, is used to access the Ad server 120.

The Ad engine 130 is used for access to the Ad server 120 and interaction with an advertising application (Ad App) 150, which is an application that takes advantage of the MobAd enabler. The Ad engine 130 supports a function capable of allowing the advertising application 150 to access the mobile advertising service. The Ad engine 130 includes an Ad acquisition and delivery function 134, an Ad selection function 132, an Ad metrics handling function 133, and a user/service/device data handling function 131 as in a detailed block diagram of the Ad engine 130 and the Ad server 120 shown in FIG. 2.

Figure 2:
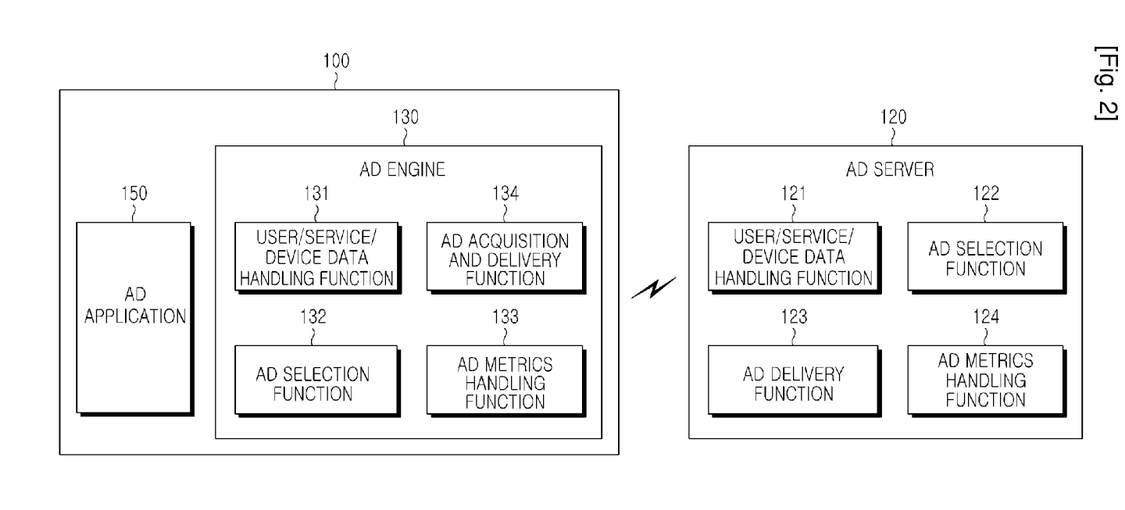
FIG. 2 is a detailed block diagram of the terminal (or Ad engine) and the Ad server shown in FIG. 1.

The Ad acquisition and delivery function 134 receives advertisements from the Ad server 120, and handles and delivers the received advertisements. The Ad selection function 132 selects an appropriate advertisement among the advertisements stored in a cache (not shown) of the terminal, based on input data and Contextualization and Personalization Information (C&PI) in an advertisement request message received from the advertising application 150.

The Ad metrics handling function 133 receives metrics from the advertising application 150, combines the metrics with information (e.g., the time for which metrics are measured) known to the Ad engine 130, checks and records the fraudulence/non-fraudulence of the received metrics, and provides the metrics to the Ad server 120.

The user/service/device data handling function 131 handles dynamic/static information of the user/device, and provides MobAd service-related data (e.g., rule and policy). The user/service/device data handling function 131 creates a group creation request message and a group information update request message, which are described below. A detailed description will be given with reference to FIGS. 4 and 5.

The Ad server 120 shown in FIG. 2, which is a MobAd enabler component located in the network, provides advertisements to the Ad engine 130 and a service provider application (SP App) 140. The Ad server 120 includes an Ad selection function 122, an Ad delivery function 123, an Ad metrics handling function 124, and a user/service/device data handling function 121.

The Ad selection function 122 selects an appropriate advertisement using C&PI, Ad metadata, MobAd rule, etc.

The Ad delivery function 123 delivers Ad metadata and advertisements or Ad campaigns, a reference to the Ad metadata and advertisements or Ad campaigns, and an indicator indicating the absence of an appropriate data, to the Ad engine 130 and the service provider application 140.

The Ad metrics handling function 124 collects Ad impression and user response information received from the Ad engine 130 and the service provider application 140, collects and handles metrics-related information (e.g., information about the time for which the advertisement has been exposed), and integrates the collected metrics.

The user/service/device data handling function 121 handles user C&PI, handles MobAd service-related data, handles a group for advertisement providing, handles advertising channels, and handles advertisements and Ad metadata. The user/service/device data handling function 121 creates a group creation response message and a group information update response message, described below. A detailed description will be given with reference to FIGS. 4 and 5.

The advertising application 150, an external entity executed in the terminal, is used to receive an advertisement from the Ad engine 130 by requesting the advertisement, show the user the received advertisement, and provide Ad metrics to the Ad engine 130. Examples of the advertising application 150 may include a messaging client, a web browser, a gaming client, etc.

The service provider application 140, an external entity, is used to receive an advertisement from the Ad server 120 by requesting the advertisement, show the user the received advertisement together with contents, and provide Ad metrics to the Ad server 120. Examples of the service provider application 140 may include web portals, Multimedia Messaging Service (MMS) Relay/Server, Short Message Service Center (SMSC), a gaming server, etc.

Contextualization and Personalization Resources (C&PR) is a cache of user-related information, and a handling and providing method for the information is not defined in the mobile advertising system. Examples of C&PR may include personal characteristics, preferences, and current situation of a user. C&PR is used to determine the requirements of the user when selecting an advertisement.

Table 1 below shows interfaces used between the components (logical entities) in FIG. 1.

TABLE 1

| Interface | Description |
| --- | --- |
| MobAd-1 | MobAd-1 is an interface between Ad Engine and Ad App, and this interface is provided to Ad App by Ad Engine. This interface is used when Ad App sends a request for advertisement and advertisement-related ID to Ad Engine or provides advertisement metrics to Ad Engine |
| MobAd-2 | MobAd-2 is an interface between Ad Server and SP App, and this interface is provided to SP App by Ad Server. This interface is used when SP App sends a request for advertisement and provides advertisement metrics to Ad Server, or when Ad Server sends an Ad response and its associated Ad ID to SP App. |
| MobAd-3 | MobAd-3 is an interface between Ad Server and Ad Engine, and this interface is provided to Ad Engine by Ad Server. This interface is used when Ad Engine sends a request for advertisement and advertisement-related ID or provides advertisement metrics to Ad Server. |
| Delv-1 | Delv-1 is an optional interface provided by Ad Engine, and Ad Engine receives advertisement and Ad metadata through the interface using push and broadcast transmission devices in its sub entity. Ad Server uses the interface to deliver advertisements, Ad notification, and service notification to Ad Engine. |

Figure 3:
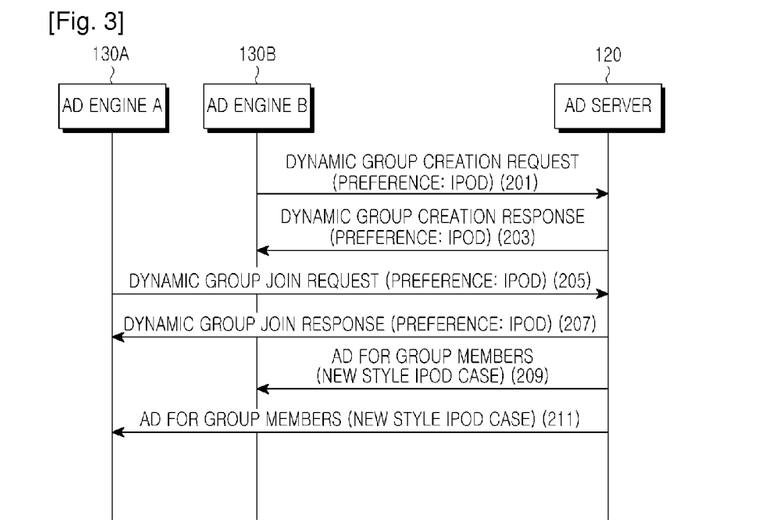
FIG. 3 shows an Ad engine-Ad server operation flow for providing a mobile advertising service in the conventional mobile advertising system.

FIG. 3 shows an Ad engine-Ad server operation flow for handling a group preference in the conventional mobile advertising system.

In step 201, an Ad engine B 130B sends a group creation request message to the Ad server 120 to receive a personalized advertising service. The group creation request message includes information about a preference of the user that uses the Ad engine B 130B. In FIG. 3, the preference of the user using the Ad engine B 130B is written as IPod by way of example. In step 203, the Ad server 120 then processes an authentication procedure for the Ad engine B 130B, creates a group depending on the user preference in the group creation request message, creates a response message to the received group creation request message, and sends it to the Ad engine B 130B. Thereafter, the Ad engine A 130A sends a group join request message for joining the group that the Ad engine B 130B created in step 203, to the Ad server 120 in step 205. In step 207, the Ad server 120 processes an authentication procedure for the Ad engine A 130A, creates a group join response message to the received group join request message, and sends it to the Ad engine A 130A. Thereafter, in step 209, the Ad server 120 delivers an advertisement for group members to the Ad engine B 130B. Also, in step 211, the Ad server 120 delivers the same advertisement as that delivered to the Ad engine B 130B, to the Ad engine A 130A. Steps 209 and 211 may be performed at the same time, step 209 may be performed earlier than step 211, or step 211 may be performed earlier than step 209.

It can be understood in the conventional mobile advertising service of FIG. 3 that since the preference that the user provides to receive a personalized advertisement is personal information specific to a particular user, it is strictly limited for other users to use this information. To address this problem, the present invention provides a method for sharing group user preference information, which is described with reference to FIGS. 4 and 5.

Figure 4:
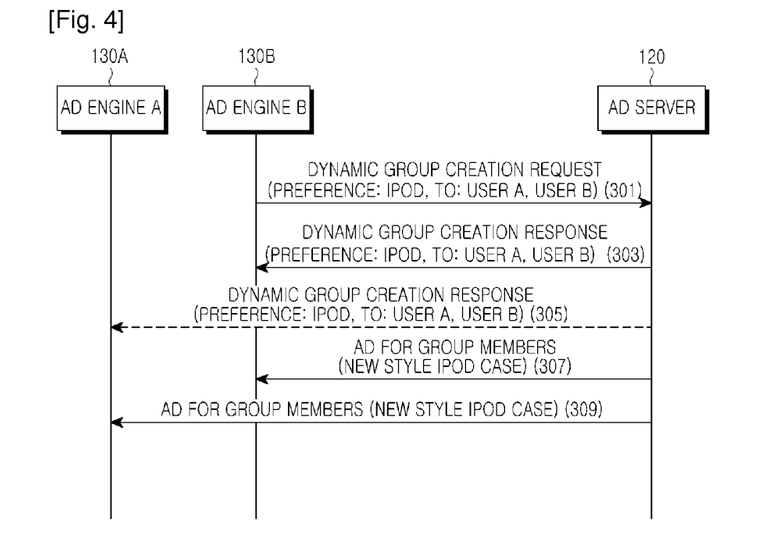
FIG. 4 shows an Ad engine-Ad server operation flow (group information creation method) for providing a mobile advertising service in a mobile advertising system according to an embodiment of the present invention.

FIG. 4 shows an Ad engine-Ad server operation flow for handling a group preference in a mobile advertising service system according to an embodiment of the present invention.

Shown in FIG. 4 is an example of a group creation procedure for sharing group user preference information to transmit/receive a personalized advertisement in a mobile advertising system.

The mobile advertising system includes Ad engines (an Ad engine A 130A and an Ad engine B 130B) and an Ad server 120. The Ad engines 130A and 130B are both located in different mobile terminals and used to access the Ad server 120. The Ad engine A 130A and the Ad engine B 130B are assumed to belong to the same group. The group creation procedure for sharing group user preference information is a procedure in which the Ad engine B 130B informs the Ad server 120 of the user's preference through a group creation request message, and then the Ad server 120 provides a personalized advertising service to the Ad engine A 130A and the Ad engine B 130B based on the received user preference information.

To receive the personalized advertising service of FIG. 4, the Ad engine B 130B provides a group creation request message including group user information to the Ad server 120 in step 301. For example, information of the group creation request message can be shown as in Table 2, but this table is not intended to limit the message format.

TABLE 2

| Name | Description |
| --- | --- |
| Message Type | Group Creation Request Message |
| Message ID | ID of Group Creation Request Message, globally unique |
| Group ID | ID of group requested to be created, multiple groups are available. |
| Group Name | Name list of groups to which users belong, group list can be written in different languages |
| Preferred Language | Preferred language |
| Version | Version of Group Creation Request Message, old version is replaced by new version |
| Valid from | It indicates the point from which a group created to receive the service is valid. |
| Valid to | It indicates the point up to which the group created to receive the service is valid |
| Group User list | List of users that will receive personalized advertisements based on group user information. |
| Group User Preference | Preference (e.g., IPod or Samsung Yepp) that users in the group list set to receive personalized advertisements from Ad Server |

Figure 5:
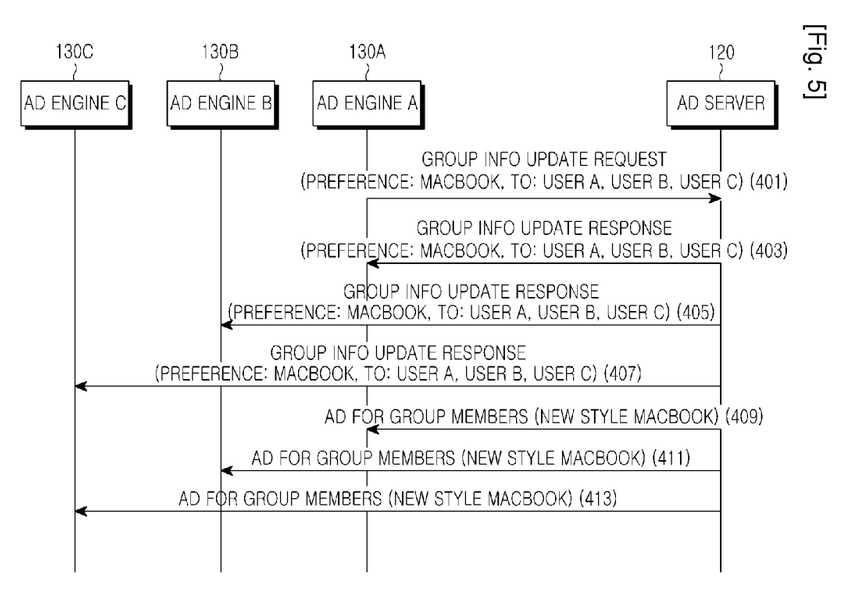
FIG. 5 shows an Ad engine-Ad server operation flow (group information update method) for providing a mobile advertising service in a mobile advertising system according to an embodiment of the present invention.

A 'Message Type' field in Table 2 indicates a group creation request message. A 'Message ID' field indicates an ID of the group creation request message, and a 'Group ID' field indicates an ID of a group requested to be created. When multiple groups exist, they may be identified by different Group IDs. A 'Group Name' field indicates a list of names of groups to which users belong, and the group name list may be written in different languages. A 'Preferred Language' field indicates a preferred language in which an advertisement the user desires to receive is created. A 'Version' field indicates a version of the group creation request message. The Ad server may replace the old version with a new version as shown in FIG. 5. A 'Valid from' field indicates the point from which a group created to receive the service is valid, and a 'Valid to' field indicates the point up to which the group created to receive the service is valid. A 'Group User list' field indicates a list of users capable of receiving a personalized advertisement based on group user information. A 'Group User Preference' field indicates criteria for the preference that users in the group list set to receive the personalized advertisement from the Ad server based on the group user information. Several criteria for the preference of group user information may be set at once, and the set criteria are all applied to the associated group user information. The 'Group User Preference' field includes Preference Language, Genre, Brand, etc. as the criteria for the preference.

In step 303, the Ad server 120 processes an authentication procedure for the Ad engine B 130B, creates a response message to the received group creation request message, and sends it to the Ad engine B 130B. In step 305, the Ad server 120 sends the response message to the group creation request message to the Ad engine A 130A, which corresponds to users written in the user list of Table 2. Step 305 is optional. That is, the Ad server 120 may or may not send the response message to the Ad engine A 130A in step 305. Steps 303 and 305 may be performed at the same time, step 303 may be performed earlier than step 305, or step 305 may be performed earlier than step 303.

For example, fields included in the response message to the group creation request message can be shown as in Table 3 below, but this table is not intended to limit the message format.

TABLE 3

| Name | Description |
| --- | --- |
| Message Type | Group Creation Response Message |
| Message ID | ID of Group Creation Response Message to Group Creation Request Message, same as ID of Group Creation Request Message |
| Status | Status information such as success, failure, reasons for the failure, etc., with regard to group creation request |

Among the fields included in the response message sent in steps 303 and 305, a 'Message Type' field indicates the group creation response message, and a 'Message ID' field indicates an ID of the group creation response message to the group creation request message sent in step 301, and uses the same ID as the ID of the group creation request message sent in step 301. A 'Status' field indicates status information such as success, failure, reasons for the failure, etc. with regard to the group creation request.

If the group creation request-related procedure is successfully performed as in steps 303 and 305, the Ad server 120 selects a personalized advertisement depending on the user preference and delivers the selected personalized advertisement to the Ad engine B 130B in step 307. In step 309, the Ad server 120 delivers the personalized advertisement to the Ad engine A 130A depending on the group user preference. Steps 307 and 309 may be simultaneously performed, step 307 may be performed earlier than step 309, or step 309 may be performed earlier than step 307. The same personalized advertisement is delivered to the Ad engine A 130A and the Ad engine B 130B.

FIG. 5 is a flow diagram showing a group preference update method in a mobile advertising system according to a second embodiment of the present invention.

The mobile advertising system includes Ad engines (an Ad engine A 130A and an Ad engine B 130B), an Ad engine C 130C, and an Ad server 120. The Ad engines 130A, 130B and 130C are all located in different mobile terminals and used to access the Ad server 120. It is assumed in FIG. 5 that the Ad engine A 130A, the Ad engine B 130B and the Ad engine C 130C belong to the same group. In step 401, the Ad engine A 130A provides group user information to the Ad server 120 to receive a personalized advertisement service. The group user information is shown in Table 4 below. The Ad engine A 130A sends a group information update request message including the group user information to the Ad server 120. Fields included in the group information update request message can be shown as in Table 4 below, but this table is not intended to limit the message format.

TABLE 4

| Name | Description |
| --- | --- |
| Message Type | Group Information Update Request Message |
| Message ID | ID of Group Information Update Request Message, globally unique |
| Group ID | ID of group for which information update is to be requested |
| Name | Name list of group to which users belong and for which information update is to be requested. Group list can be written in different languages. |
| Preferred Language | Preferred Language |
| Valid from | It indicates the point from which a group created to receive the service is valid. |
| Valid to | It indicates the point up to which the group created to receive the service is valid. |
| Group User list | List of users that will receive personalized advertisements based on group user information |
| Group User Preference | Preference (e.g., IPod or Samsung Yepp) that users in the group list set to receive personalized advertisements from Ad Server. |

In step 403, the Ad server 120 processes an authentication procedure for the Ad engine A 130A, and if update information (or update matters) exists, the Ad server 120 checks and stores the update information of the group information. In step 403, the Ad server 120 also creates a response message to the received group information update request message, and sends it to the Ad engine A 130A. In steps 405 and 407, the Ad server 120 sends the group information update response message with the updated group information to the Ad engine B 130B and the Ad engine C 130C written in the Group User list of Table 4. Steps 405 and 407 are optional. That is, the Ad server 120 may or may not send the group information update response message to the Ad engine B 130B and the Ad engine C 130C in steps 405 and 407. Steps 403, 405 and 307 may be may be simultaneously performed, step 403 may be performed earlier than steps 405 and 407, step 405 may be performed earlier than steps 403 and 407, or step 407 may be performed earlier than steps 403 and 405.

For example, information of the group information update response message with the updated group information may be shown as in Table 5, but this table is not intended to limit the message format.

TABLE 5

| Name | Description |
| --- | --- |
| Message Type | Group Information Update Response Message |
| Message ID | ID of Group Information Update Response Message, same as ID of Group Information Update Request Message |
| Status | Status information such as success, failure, reasons for the failure, etc., with regard to group information update request |
| Update Info | Item informing group users of updated group information |

If the group user information update procedure is successfully performed, the Ad server 120 delivers a personalized advertisement to the Ad engine A 130A depending on the preference set in the group user information in step 409. In step 411, the Ad server 120 delivers the personalized advertisement to the Ad engine B 130B depending on the preference set in the group user information. In step 413, the Ad server 120 delivers the personalized advertisement to the Ad engine C 130C depending on the preference set in the group user information. Similarly, steps 409, 411 and 413 may be simultaneously performed, step 409 may be performed earlier than steps 411 and 413, step 411 may be performed earlier than step 409 and 413, or step 413 may be performed earlier than steps 409 and 411.

While the invention has been shown and described with reference to certain exemplary embodiments thereof, it will be understood by those skilled in the art that various changes in form and details may be made therein without departing from the spirit and scope of the invention as defined by the appended claims and their equivalents.

The invention claimed is:

1. A method for providing a mobile advertising service in a server of a mobile advertising system, the method comprising:
   receiving, by a receiver of the server, a first message for requesting a group creation from a terminal including an advertising engine, wherein the first message includes a user list including the terminal and a group user preference;
   creating, by a processor of the server, a group by using the user list and the group user preference included in the received first message;
   sending, by the processor of the server, a response message, in response to the received first message, to a plurality of terminals included in the created group;
   receiving, by the processor of the server, a second message for requesting an advertisement from one of the plurality of terminals included in the created group;
   selecting, by the processor of the server, an advertisement appropriate for the group user preference by using contextualization and personalization information including a personal characteristic, preference, and current situation of a user;
   delivering, by the processor of the server, the selected advertisement to at least one terminal included in the user list;
   receiving, by the receiver of the server, a third message for requesting a group information update, wherein the third message includes group user information in which update information is reflected;
   checking and storing, by the processor of the server, the update information in the group user information, if the update information exists;
   sending, by the processor of the server, in response to the third message, a response message to at least one terminal included in the group user information; and
   delivering, by the processor of the server, an advertisement to the at least one terminal included in the group user information.

2. The method of claim 1, wherein the at least one terminal included in the user list is included in a same group.

3. The method of claim 1, wherein the first message includes a 'message ID' field indicating an Identifier (ID) of the first message, a 'group ID' field indicating an ID of a group requested to be created, a 'user list' field indicating a list of users receiving a personalized advertisement based on group user information, a 'group user preference' field indicating a preference set by users in a group list to receive a personalized advertisement from the server, and a 'version' field indicating a current version of the first message.

4. The method of claim 1, wherein the selected advertisement includes at least one of advertisement metadata, an advertising campaign, a reference to the advertising campaign, and an indicator indicating absence of an appropriate advertisement.

5. The method of claim 1, wherein selecting the advertisement appropriate for the group user preference further comprises selecting, by the processor of the server, the appropriate advertisement by using at least one of advertisement metadata and an advertising rule.

6. The method of claim 1, wherein delivering the advertisement comprises:
   determining, by the processor of the server, whether a group user information update procedure has been completed; and
   delivering, by the processor of the server, the advertisement to the at least one terminal included in the group user information, if the group user information update procedure has been completed.

7. The method of claim 1, wherein the at least one terminal-included in the group user information is included in a same group.

8. An apparatus for providing a mobile advertising service in an advertising server of a mobile advertising system, the apparatus comprising:
   a receiver configured to receive, from a terminal including an advertising engine, a first message for requesting a group creation, wherein the first message includes a user list including the terminal and a group user preference; and
   a processor configured to
      create a group by using the received user list and group user preference in the first message;
      send, in response to the received first message, a response message to a plurality of terminals included in the user list;
      receive a second message for requesting an advertisement from one of the plurality of terminals;
      select an advertisement appropriate for the group user preference by using contextualization and personalization information including a personal characteristic, preference, and current situation of a user;
      deliver the selected advertisement to at least one terminal included in the user list;
      upon receiving a third message for requesting a group information update, wherein the third message includes group user information in which update information is reflected, from a terminal, determine whether update information exists, and create, in response to the third message, a response message in which the update information in the group user information is reflected, if the update information exists,
wherein the apparatus further comprises a memory configured to store the update information in the group user information, and
wherein the processor is further configured to deliver the third message and an advertisement to at least one terminal included in the group user information.

9. The apparatus of claim 8, wherein the at least one terminal included in the user list is included in a same group.

10. The apparatus of claim 8, wherein the processor is further configured to select the appropriate advertisement using at least one of advertisement metadata and an advertising rule.

11. The apparatus of claim 8, wherein the at least one terminal included in the group user information is included in a same group.

12. The apparatus of claim 8, wherein the processor is further configured to determine whether a group user information update procedure has been completed, and deliver the advertisement to the at least one terminal in the group user information.

13. A terminal for providing a mobile advertising service, the terminal comprising:
a processor configured to
generate a first message for requesting a group creation, wherein the first message includes a user list including the terminal and a group user preference;
send the first message to a server;
receive, from the server, a response message in response to the first message;
generate a second message for requesting a group information update;
send the second message to the server; and
receive, from the server, a group information update response message, in response to the second message; and
a display configured to display an advertisement received from the server,
wherein, the response message is sent, by the server, to a plurality of terminals included in the user list, and
wherein the advertisement received from the server is selected by the server by using contextualization and personalization information including a personal characteristic, preference, and current situation of a user.

14. The terminal of claim 13, wherein the plurality of terminals included in the user list are included in a same group.

15. The terminal of claim 13, wherein the advertisement received from the server includes at least one of advertisement metadata, an advertising campaign, a reference to the advertising campaign, and an indicator indicating absence of an appropriate advertisement.

16. The terminal of claim 13, wherein the advertisement received from the server is selected by the server further using at least one of advertisement metadata and an advertising rule.

17. A method for providing a mobile advertising service in a terminal, the method comprising:
generating, by a processor of the terminal, a first message for requesting a group creation, wherein the first message includes a user list including the terminal and a group user preference;
sending, by the processor of the terminal, the first message to a server;
receiving, by the processor of the terminal, a response message from the server in response to the first message;
displaying, by a display of the terminal, an advertisement received from the server;
generating, by the processor of the terminal, a second message for requesting a group information update;
sending, by the processor of the terminal, the second message to the server; and
receiving, by the processor of the terminal, a group information update response message, in response to the second message,
wherein, the response message is sent, by the server, to a plurality of terminals included in the user list, and
wherein the advertisement received from the server is selected by the server by using contextualization and personalization information including a personal characteristic, preference, and current situation of a user.

18. The method of claim 17, wherein the plurality of terminals included in the user list are included in a same group.

19. The method of claim 17, wherein the advertisement received from the server is selected by the server further using at least one of advertisement metadata and an advertising rule.

* * * * *